(12) United States Patent
Thayer et al.

(10) Patent No.: US 11,267,100 B2
(45) Date of Patent: Mar. 8, 2022

(54) PLASMA ASSISTED SURFACE FINISHING APPARATUS AND METHOD

(71) Applicant: Raytheon Technologies Corporation, Farmington, CT (US)

(72) Inventors: Henry H. Thayer, Wethersfield, CT (US); Wendell V. Twelves, Glastonbury, CT (US); Anthony Patrick Ventura, South Glastonbury, CT (US); Michael Walter Bennett, Lebanon, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 17/079,581

(22) Filed: Oct. 26, 2020

(65) Prior Publication Data

US 2021/0039227 A1 Feb. 11, 2021

Related U.S. Application Data

(63) Continuation of application No. 15/843,403, filed on Dec. 15, 2017, now Pat. No. 10,850,366.

(51) Int. Cl.
| | | |
|---|---|---|
| *B24C 1/10* | (2006.01) | |
| *B23K 10/00* | (2006.01) | |
| *B24C 1/04* | (2006.01) | |
| *B23P 25/00* | (2006.01) | |
| *B24C 3/06* | (2006.01) | |
| *B23K 26/00* | (2014.01) | |

(52) U.S. Cl.
CPC ............... *B24C 1/10* (2013.01); *B23K 10/00* (2013.01); *B23K 26/0093* (2013.01); *B23P 25/003* (2013.01); *B24C 1/04* (2013.01); *B24C 3/06* (2013.01)

(58) Field of Classification Search
CPC .... B24C 1/10; B24C 1/04; B24C 3/06; B23K 10/00; B23K 26/0093; B23P 25/003
See application file for complete search history.

(56) References Cited

U.S. PATENT DOCUMENTS

| | | |
|---|---|---|
| 5,571,335 A | 11/1996 | Lloyd |
| 5,759,086 A | 6/1998 | Klingel |
| 6,183,348 B1 | 2/2001 | Bingham et al. |

(Continued)

FOREIGN PATENT DOCUMENTS

| | | |
|---|---|---|
| CA | 3014855 | 8/2017 |
| CN | 203393190 | 1/2014 |

(Continued)

OTHER PUBLICATIONS

The Extended European Search Report for EP Application No. 18212082.4, dated Apr. 18, 2019.

*Primary Examiner* — Donnell A Long
(74) *Attorney, Agent, or Firm* — Carlson, Gaskey & Olds, P.C.

(57) ABSTRACT

An apparatus for finishing a component includes at least one articulating arm, at least one plasma gun disposed at an end of a first articulating arm of the at least one articulating arm, at least one shot peen nozzle maintained in a fixed positioned relative to the plasma gun, and a controller controllably coupled to the articulating arm such that output signals from the controller control motions of the articulating arm.

17 Claims, 2 Drawing Sheets

(56) References Cited

U.S. PATENT DOCUMENTS

| | | | |
|---|---|---|---|
| 7,887,393 B2 | 2/2011 | Mase et al. | |
| 9,352,355 B1 | 5/2016 | Jackson et al. | |
| 2004/0104207 A1* | 6/2004 | Wu | B23K 28/02 |
| | | | 219/121.73 |
| 2019/0202008 A1* | 7/2019 | Buske | B23K 10/00 |
| 2021/0178485 A1* | 6/2021 | Comu | B23P 15/00 |

FOREIGN PATENT DOCUMENTS

| | | |
|---|---|---|
| GB | 2411662 | 9/2005 |
| JP | H10286774 | 10/1998 |
| WO | 2012091616 | 7/2012 |

* cited by examiner

PLASMA ASSISTED SURFACE FINISHING APPARATUS AND METHOD

CROSS-REFERENCE TO RELATED APPLICATION

This application is a Continuation of U.S. patent application Ser. No. 15/843,403 filed on Dec. 15, 2017.

TECHNICAL FIELD

The present disclosure relates generally to a method and apparatus for finishing a surface of a part, and more specifically to a method and apparatus for plasma assisted shot peening of the surface.

BACKGROUND

Various techniques for manufacturing components, such as those used in complex machinery, can result in flaws or defects at or near the surface of the manufactured component. By way of example, an additively manufactured component can generally have high surface roughness, porosity, and fissures in the surface of the component. In order to reduce the impact of, or remove the presence of, the flaws or defects, parts susceptible to such flaws are typically subjected to one or more finishing processes. One finishing process used in such applications is shot peening.

While additively manufactured components comprised of certain materials can be particularly susceptible to such flaws or defects, it can also be desirable to apply similar finishing processes to components constructed according to alternative manufacturing processes including casting and milling.

SUMMARY OF THE INVENTION

An exemplary method for finishing a surface includes passing a plasma jet along a surface thereby creating a localized soft area, and trailing the plasma jet with a shot peen nozzle such that the localized soft area is exposed to shot projected from the shot peen nozzle.

In another example of the above described method for finishing a surface a relative position of a plasma gun originating the plasma jet and the shot peen nozzle is static throughout a duration of a shot peen finishing process.

In another example of any of the above described methods for finishing a surface passing the plasma jet along the surface comprises passing the plasma jet along a surface at a speed sufficient to ensure creation of a localized soft area in a single pass.

In another example of any of the above described methods for finishing a surface the localized soft area has a width of approximately one centimeter.

In another example of any of the above described methods for finishing a surface passing a plasma jet along a surface comprises passing multiple serially arranged plasma jets along the surface.

In another example of any of the above described methods for finishing a surface each of the serially arranged plasma jets overlaps at least one adjacent plasma jet, thereby increasing a width of the created localized soft area.

Another example of any of the above described methods for finishing a surface further includes preventing at least one of errant shot and reflected shot from entering the plasma jet.

In another example of any of the above described methods for finishing a surface a shot guard is disposed between the shot peen nozzle and the plasma jet.

Another example of any of the above described methods for finishing a surface further includes preventing at least one of errant shot and reflected shot from intersecting the plasma jet.

In another example of any of the above described methods for finishing a surface preventing the at least one of errant shot and reflected shot from intersecting the plasma jet is at least partially achieved by disposing a shot guard between the shot peen nozzles and the plasma jet.

In another example of any of the above described methods for finishing a surface preventing the at least one of errant shot and reflected shot from intersecting the plasma jet is at least partially achieved by angling the shot peen nozzle relative to the plasma jet.

In another example of any of the above described methods for finishing a surface preventing the at least one of errant shot and reflected shot from intersecting the plasma jet is at least partially achieved by disposing a shot guard between the shot peen nozzles and the plasma jet and by angling the shot peen nozzle relative to the plasma jet.

In one exemplary embodiment an apparatus for finishing a component includes at least one articulating arm, at least one plasma gun disposed at an end of a first articulating arm of the at least one articulating arm, at least one shot peen nozzle maintained in a fixed positioned relative to the plasma gun, and a controller controllably coupled to the articulating arm such that output signals from the controller control motions of the articulating arm.

In another example of the above described apparatus for finishing a component the at least one plasma gun comprises a plurality of series configured plasma guns.

In another example of any of the above described apparatus for finishing a component each plasma gun is fixedly mounted relative to each other plasma gun.

In another example of any of the above described apparatus for finishing a component the shot peen nozzle is mechanically fixed to the end of the first articulating arm.

In another example of any of the above described apparatus for finishing a component the shot peen nozzle is mechanically connected to a second articulating arm of the at least one articulating arm, and wherein a controller maintains a static relative position of the shot peen nozzle and the plasma gun.

In another example of any of the above described apparatus for finishing a component the shot peen nozzle is mechanically connected to the at least one plasma gun via an offset arm.

In another example of any of the above described apparatus for finishing a component the offset arm that includes at least one more angle such that the shot peen nozzle is angled relative to an output of the plasma gun.

These and other features of the present invention can be best understood from the following specification and drawings, the following of which is a brief description.

DETAILED DESCRIPTION OF AN EMBODIMENT

Additively manufactured components, as well as some components manufactured using other manufacturing techniques, can include undesirable characteristics such as high surface roughnesses, undesirable porosity at or near the surface, and fissures in one or more of the exterior surfaces of the component. Many internal flaws can be corrected using a hot isostatic press finishing technique. However, hot isostatic pressing is ineffective at addressing surface roughness and porosity near the surface of a workpiece.

Shot peening is one alternative that can be used to flatten or otherwise finish the surfaces of additively manufactured components. Shot peening is a cold working process that produces a compressive residual stress layer at the surface of a component and modifies mechanical properties of metals and composites. Shot peening entails repeatedly impacting a surface with shot (e.g. round metallic, glass, or ceramic particles) with force sufficient to create plastic deformation in the surface.

In some cases additively manufactured materials can have surface conditions and flaws that shot peening at room temperature is incapable of mitigating. Softening the material, such as by the application of localized heat, prior to impacting the surface with the shot can reduce the resistance to deformation of the surface thereby facilitating a shot peen finishing method.

Further, because shot peening involves repeatedly impacting a surface with multiple hard spheroids to generate plastic deformation in the surface, it is necessary that the surface of the material be more susceptible to deformation than the spheroids themselves. If the surface is less susceptible to the deformation, then the spheroids will deform and there will be relatively little impact on the surface itself. Some materials utilized in additively manufactured components and in similar components are less susceptible to deformation at room temperature than the shot from the shot peening process.

Figure 1A:
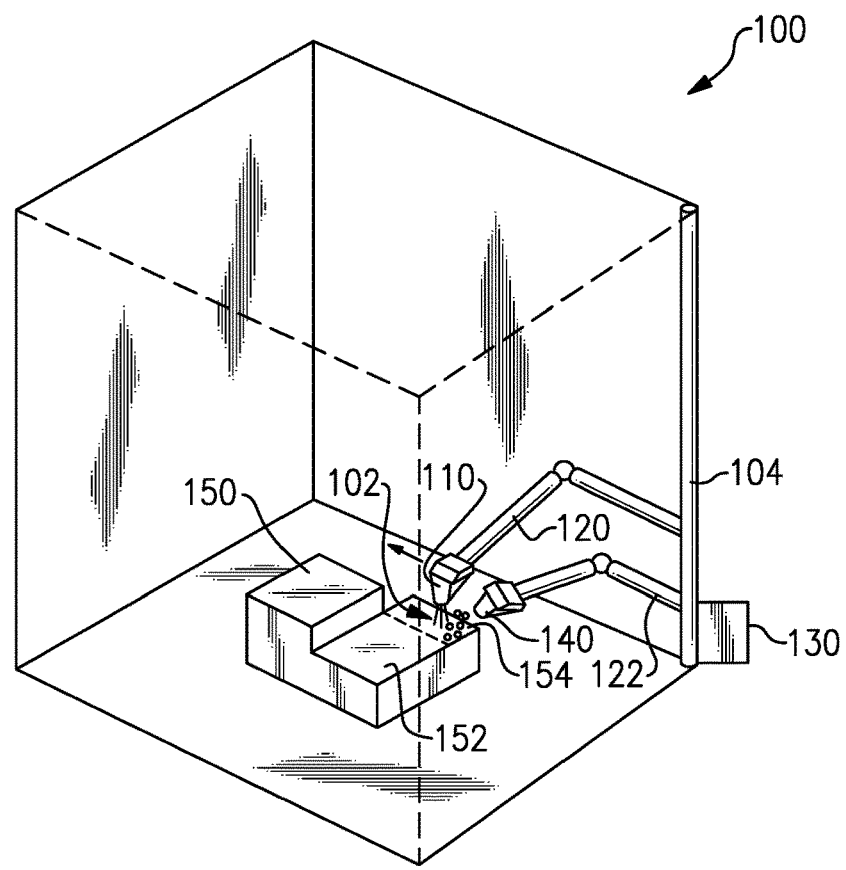
FIG. 1A illustrates a schematic view of a component finishing apparatus.
Figure 1B:
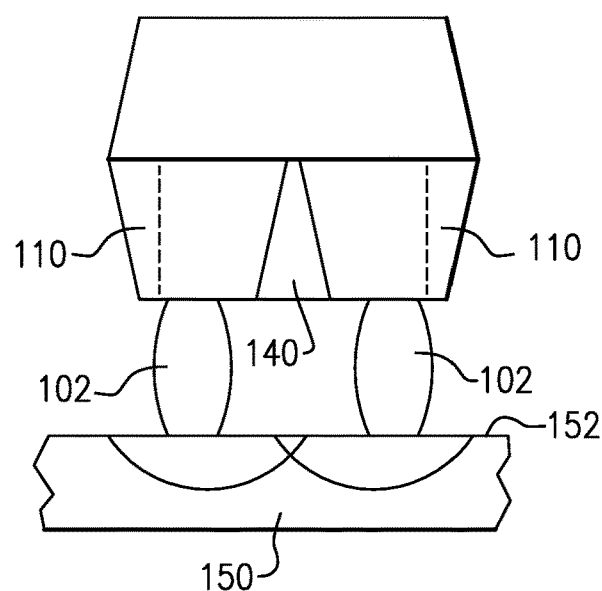
FIG. 1B illustrates a schematic view of the end of the articulating arm of FIG. 1A according to another example.

FIG. 1 schematically illustrates an exemplary finishing apparatus 100 configured to apply a plasma jet 102 generated from a plasma gun 110 to a surface 152 of a component 150. The plasma gun 110 can generate the plasma jet 102 using any known plasma generation process and can be configured in any known plasma gun configuration. The plasma gun 110 is mounted to an end of an articulation arm 120. The articulation arm 120 is, in turn, mounted to a frame 104 of the apparatus 100, and is controlled by a controller 130. The controller 130 is connected to sensors, servos, motors, and other known control and monitoring electronics within the apparatus 100 to enable full articulation of the articulating arm 120, and thereby control the positioning of the plasma jet 102.

Also connected at the end of the articulating arm 120 is a shot peen nozzle 140. In the illustrated example, the shot peen nozzle 140 has a fixed position relative to the plasma gun 110. In alternative examples, the shot peen nozzle 140 can be connected to a hopper, a shot feed, or any other source of shot for the shot peening operation, and is configured to project the shot toward the surface 152 of the component 150 utilizing mechanical rotation within the shot peen nozzle 140, compressed gas, or any other known shot projection methodology. By positioning the shot peen nozzle 140 relative to the plasma gun 110, the controller 130 can ensure that the shot projected by the shot peen nozzle 140 impacts a localized soft area 154 of the surface 152 created by exposure to the plasma jet 102 a predetermined time after the plasma jet 102 has heated the area during a surface finishing operation. In examples utilizing fixed relative positions throughout the process, the shot peening can be utilized on straight surfaces 152, relatively simple curved surfaces, and on compound curved surfaces. As utilized herein, a simple curved surface refers to a surface across which the arc of the curve has a single radius.

The plasma gun 110 generates an approximately circular jet impact spot on the surface 152 of the component 150. The jet impact spot is, in some examples, approximately one centimeter in diameter and can have temperatures of approximately 10,000 K. The specific spot temperature of any given system can be adjusted through altering aspects of the voltage, the current, the nozzle, standoff distance between the nozzle and the surface 152, the speed that the plasma is scanned across the surface 152 or the gas makeup according to known techniques. One of skill in the art will appreciate that the temperature should be set such that the surface 152 is heated, but not melted. By passing the plasma jet 102 along the surface 152 of the component 150, a localized heated area 154 is generated at the portions of the surface 152 contacted by the jet impact spot. The depth into the surface 152 of the localized heated area 154 is dependent upon the temperature of the plasma jet 102, the material characteristics of the component 150, and would be known to one of skill in the art ahead of operations. Based on this knowledge, one of skill in the art can determine an appropriate scan speed (rate at which the plasma jet travels across the surface 152) in order to generate a localized heated area 154 of sufficient depth into the surface 152.

In some examples, particularly those where a wider localized heated area 154 than is achieved from a single plasma jet 102 are desired, multiple plasma jets 102 can be arranged in a linear fashion at the end of the articulating arm 120 with a resultant jet impact spot of each plasma jet 102 partially overlapping a jet impact spot of an adjacent plasma jet 102, thereby increasing the width of the localized heated area 154 that is generated.

Figure 2:
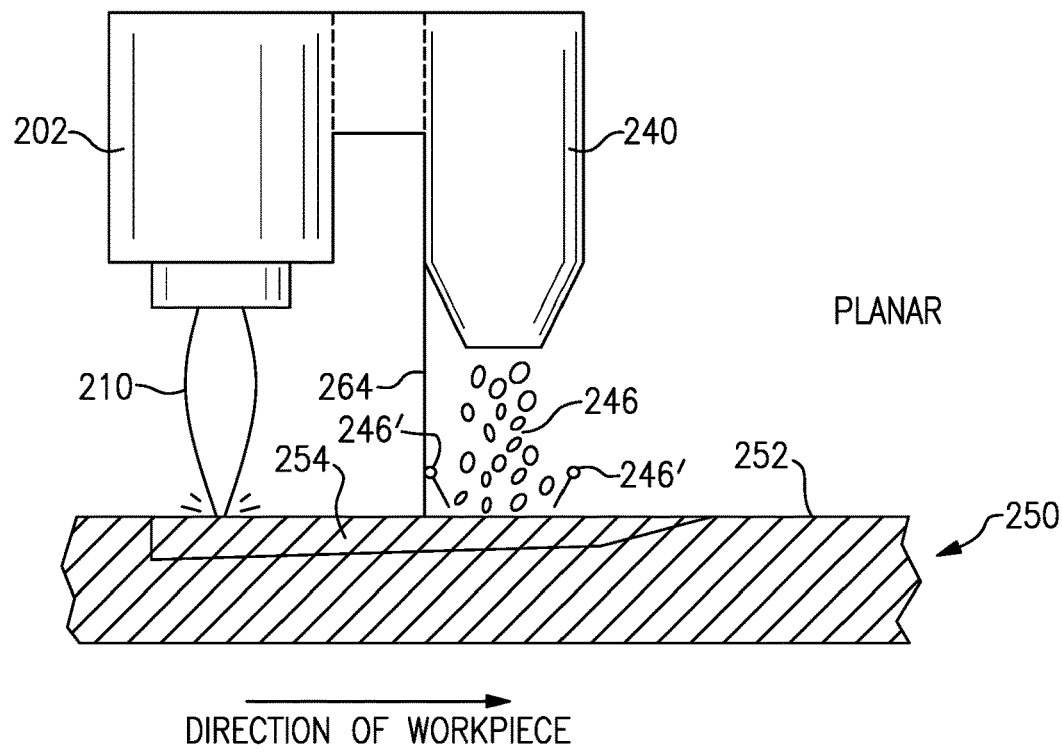
FIG. 2 schematically illustrates a side view of a single surface of a component being finished.

With continued reference to FIG. 1, and with like numerals indicating like elements, FIG. 2 schematically illustrates a view of a single surface 252 of a component being finished within a finishing apparatus, such as the apparatus 100. Initially a plasma jet 210 is scanned across a surface 252 of the component 250. The surface area of the contact between the plasma jet 210 and the surface 252 is referred to as the spot size. In some practical implementations the spot size is approximately several millimeters to centimeters. As discussed above, with regards to the example of FIG. 1, if a larger width of a localized heated area 254 is desired, additional plasma jets 210 can be positioned in a linear arrangement, with each plasma jet 210 overlapping at least one adjacent plasma jet 210.

Scanning the plasma jet 210 across the surface 252 creates a localized soft area 254 and increases the susceptibility of the localized soft area 254 to plastic deformation from shot peening impacts. While in the heated state, the localized soft area 254 is more susceptible to plastic deformation than the ambient temperature shot 246 projected from the shot peening nozzle 240. In some examples, while both the surface and the shot are at an ambient temperature, the shot 246 from the shot peening nozzle 240 is more susceptible to plastic deformation.

The plasma jet 210 heats the localized soft area 254 to a sufficient level to allow for the increased susceptibility to deformation, without creating a melt pool, and without heating the entire thickness of the component 250. The depth into the surface 252 of the localized soft area 254 is greatest at the position of the plasma jet 210, and decreases in depth as the localized soft area 254 cools. In order to ensure a desired depth of the localized soft area 254 is present when the localized soft area 254 is subject to the shot peening from the nozzle 240, the shot peen nozzle 240 is maintained in a fixed position, relative to the plasma jet(s) 210. By maintaining a fixed position, and scanning at a constant speed, a known cooling time between the localized heating and the impacting of the shot peening process is implemented with the cooling time being dependent on the offset. In one example, such as the example illustrated in FIG. 2, the fixed relative positions of the plasma gun 202 and the shot peen nozzle 240 are achieved by integrating both into a single member at the end of an articulating arm. In alternative examples, such as the example illustrated in FIG. 1, the plasma gun 110, 202 and the shot peen nozzle 140, 240 can be mounted to independent articulating arms 120, 122, and a controller can maintain the constant relative distance.

Once subjected to the shot peening, the localized soft area 254 is allowed to cool convectively. In alternative examples, alternative cooling techniques can be utilized to similar effect. In yet further examples, the shot peening itself can actively cool the localized soft area 254 by carrying away heat from the localized soft area using the reflected shot.

During operation, after the shot 246 impacts the soft area 254, the shot 246' reflects in random directions. In addition, in order to assure semi random impacts, the shot 246 exits the nozzle 240 in a semi random spray. If errant shot 246' or reflected shot 246' intercepts the plasma jet 210, contact between the plasma jet 210 and the surface 252 is interrupted. The interrupting prevents the jet 210 from continuously hitting the correct area of the surface 252, and can potentially result in insufficiently heated portions of the localized soft area 254, or overly heated areas of the localized soft area 254. In order to prevent errant shot 246' and reflected shot 246' from interfering with the plasma jet 210, a shot guard 264 is mounted to the nozzle 240. The shot guard 264 extends from the nozzle 240 toward the surface 252 between the nozzle 240 and the plasma jet 210 and blocks reflected and errant shot 246' from intersecting the plasma jet 210. In alternative examples, the nozzle 240 can be angled, relative to the plasma jet 210, such that shot 246 from the nozzle 240 is directed away from the laser 210 when the shot 246' is reflected off the surface 252. In yet further alternate examples, the nozzle 262 can be angled and a shot guard 264 can be incorporated for redundant or increased protection.

Figure 3:
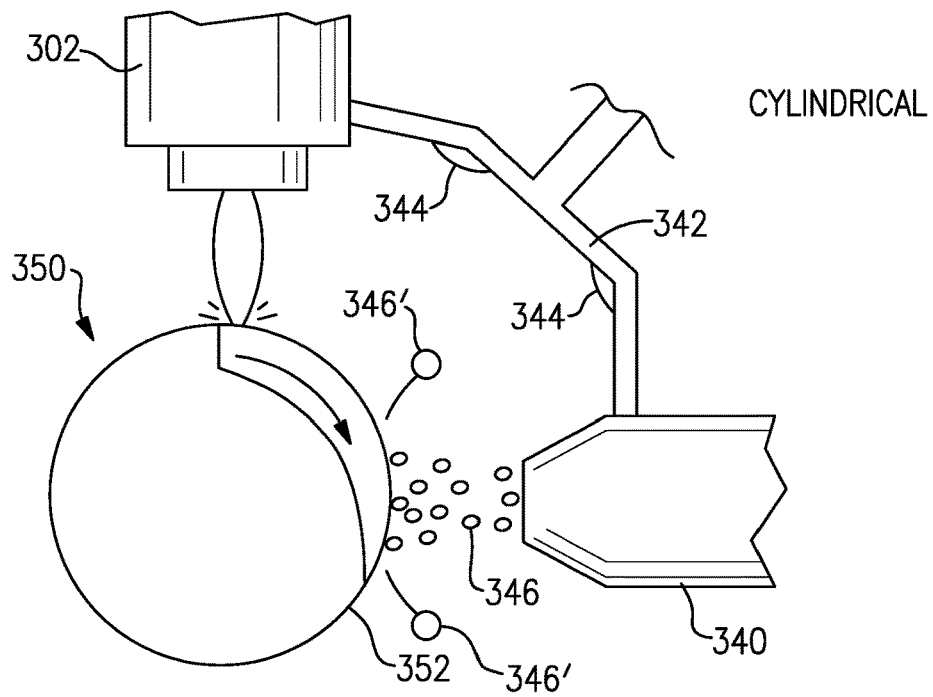
FIG. 3 schematically illustrates an alternate side view of a curved surface being finished.

With continued reference to FIGS. 1 and 2, FIG. 3 schematically illustrates an alternate component 350 being finished in a finishing apparatus, such as the apparatus 100 of FIG. 1. The alternate component 350 includes a simple curved surface 352. In order to accommodate the simple curved surface 352, the plasma gun 302 and the shot peen nozzle 340 are offset from each other via an offset arm 342 that includes one or more angle 344. The angle 344 allows the plasma gun 301 and the shot peen nozzle 340 to travel along the simple curved surface, and the specific angle 344 can be determined by one of skill in the art ahead of the shot peening operation. In examples where multiple simple curved surface finishing is desired, an adjustable offset arm can be included thereby allowing an operator of the apparatus 100 to adjust the angle depending on the curvature of the simple curved surfaces.

With reference to FIGS. 1-3, the creation of the localized soft area 254, 354, via the application of the laser energy, renders the localized soft area 254, 354 more ductile, thereby allowing the shot peen to more easily close or flatten imperfections in the surface at the localized soft area. The shot peen flattens high spots, collapses porosity, and closes fissures that can result at or near the surface in an additively manufactured component. Further as described above, the shot 346, 346' can facilitate cooling of the localized soft area 254, 354 by carrying away heat in addition to the convective cooling, returning the component to ambient temperatures relatively quickly.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

What is claimed:

1. A method for finishing a surface comprising:
   passing a plasma jet along a surface thereby creating a localized soft area;
   trailing the plasma jet with a shot peen nozzle such that the localized soft area is exposed to shot projected from the shot peen nozzle; and
   preventing at least one of errant shot and reflected shot from entering the plasma jet by disposing a shot guard between the shot peen nozzle and the plasma jet.

2. The method of claim 1 wherein a relative position of a plasma gun originating the plasma jet and the shot peen nozzle is static throughout a duration of a shot peen finishing process.

3. The method of claim 1, wherein a relative position of a plasma gun originating the plasma jet and the shot peen nozzle is adjusted at least once throughout a duration of a shot peen finishing process.

4. The method of claim 1, wherein passing the plasma jet along the surface comprises passing the plasma jet along a surface at a speed sufficient to ensure creation of a localized soft area in a single pass.

5. The method of claim 4, wherein the localized soft area has a width of approximately one centimeter.

6. The method of claim 1, wherein passing a plasma jet along a surface comprises passing multiple serially arranged plasma jets along the surface.

7. The method of claim 6, wherein each of the serially arranged plasma jets overlaps at least one adjacent plasma jet, thereby increasing a width of the created localized soft area.

8. The method of claim 1, further comprising preventing at least one of errant shot and reflected shot from intersecting the plasma jet.

9. The method of claim 8, wherein preventing the at least one of errant shot and reflected shot from intersecting the plasma jet is at least partially achieved by disposing the shot guard between the shot peen nozzle and the plasma jet.

10. The method of claim 8, wherein preventing the at least one of errant shot and reflected shot from intersecting the plasma jet is at least partially achieved by angling the shot peen nozzle relative to the plasma jet.

11. The method of claim 8, wherein preventing the at least one of errant shot and reflected shot from intersecting the plasma jet is at least partially achieved by angling the shot peen nozzle relative to the plasma jet.

12. An apparatus for finishing a component comprising:
    at least one articulating arm;
    at least one plasma gun disposed at an end of a first articulating arm of the at least one articulating arm;
    at least one shot peen nozzle mechanically fixed to one of the end of the first articulating arm and an end of a second articulating arm;
    a shot guard disposed between a plasma jet of the at least one plasma gun and the at least one shot peen nozzle; and
    a controller controllably coupled to the articulating arm such that output signals from the controller control motions of the articulating arm.

13. The apparatus of claim 12, wherein the at least one plasma gun comprises a plurality of series configured plasma guns.

14. The apparatus of claim 13, wherein each plasma gun is fixedly mounted relative to each other plasma gun.

15. The apparatus of claim 12, wherein the shot peen nozzle is mechanically connected to a second articulating arm of said at least one articulating arm.

16. The apparatus of claim 12, wherein the shot peen nozzle is mechanically connected to the at least one plasma gun via an offset arm.

17. The apparatus of claim 16, wherein the offset arm that includes at least one or more angle such that the shot peen nozzle is angled relative to an output of the plasma gun.

* * * * *